(12) United States Patent
Oh et al.

(10) Patent No.: US 11,993,619 B2
(45) Date of Patent: May 28, 2024

(54) NITROGEN-CONTAINING COMPOUND, COLOR CONVERSION FILM INCLUDING SAME, AND BACKLIGHT UNIT AND DISPLAY DEVICE INCLUDING SAME

(71) Applicant: LG CHEM, LTD., Seoul (KR)

(72) Inventors: Hye Mi Oh, Daejeon (KR); Dong Mok Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 519 days.

(21) Appl. No.: 16/634,102

(22) PCT Filed: Dec. 24, 2018

(86) PCT No.: PCT/KR2018/016583
§ 371 (c)(1),
(2) Date: Jan. 24, 2020

(87) PCT Pub. No.: WO2019/132479
PCT Pub. Date: Jul. 4, 2019

(65) Prior Publication Data
US 2020/0207788 A1    Jul. 2, 2020

(30) Foreign Application Priority Data

Dec. 27, 2017    (KR) .......... 10-2017-0180922

(51) Int. Cl.
*C07F 5/02*     (2006.01)
*C08K 5/55*    (2006.01)
*F21V 8/00*    (2006.01)

(52) U.S. Cl.
CPC .............. *C07F 5/022* (2013.01); *C08K 5/55* (2013.01); *G02B 6/005* (2013.01); *G02B 6/0031* (2013.01); *G02B 6/0046* (2013.01); *G02B 6/0055* (2013.01)

(58) Field of Classification Search
CPC ................................ C07F 5/022; C08K 5/55
See application file for complete search history.

(56) References Cited

U.S. PATENT DOCUMENTS

2012/0253050 A1    10/2012    Cabrera et al.
2018/0134952 A1*    5/2018    Ichihashi ............... C07F 5/022
(Continued)

FOREIGN PATENT DOCUMENTS

JP    2010061824    3/2010
JP    2011-241160    12/2011
(Continued)

OTHER PUBLICATIONS

Esnal et al., Blue-to-Orange Color-Tunable Laser Emission from Tailored Boron-Dipyrromethene Dyes, ChemPhysChem, vol. 14, pp. 4134-4142, 2013.*

(Continued)

*Primary Examiner* — Alexander C Kollias
(74) *Attorney, Agent, or Firm* — Bryan Cave Leighton Paisner LLP

(57) ABSTRACT

Provided are a nitrogen-containing ring compound of the following Chemical Formula 1:

(Continued)

and a color conversion film, a backlight unit and a display device including the same.

6 Claims, 1 Drawing Sheet

(56) References Cited

U.S. PATENT DOCUMENTS

| | | | |
|---|---|---|---|
| 2018/0186817 A1 | 7/2018 | Lee et al. | |
| 2018/0208838 A1* | 7/2018 | Sakaino | C09K 11/02 |
| 2018/0274753 A1 | 9/2018 | Sakaino et al. | |

FOREIGN PATENT DOCUMENTS

| | | |
|---|---|---|
| KR | 20170049360 | 5/2017 |
| KR | 20170120957 | 11/2017 |
| TW | 201726691 | 8/2017 |
| WO | 2016190283 | 12/2016 |
| WO | 2017052279 | 3/2017 |

OTHER PUBLICATIONS

Wired Chemist—Hammett Sigma Constants, pp. 1-4.*
Osorio-Martinez et al., "8-AminoBODIPYs: Cyanines or Hemicyanines? The Effect of the Coplanarity of the Amino Group on Their Optical Properties," The Journal of Organic Chemistry 77: 5434-5438 (2012).
Esnal et al., "Reaction of Amines with 8-MethylthioBODIPY: Dramatic Optical and Laser Response to Amine Substitution," Chem Asian J. 8:2691-2700 (2013).
Banuelos et al., "New 8-Amino-BODIPY Derivatives: Surpassing Laser Dyes at Blue-Edge Wavelengths," Chem. Eur. J. 17:7261-7270 (2011).
Roacho et al., "8-Amino-BODIPYs: Structural Variation, Solvent-Dependent Emission, and VT NMR Spectroscopic Properties of 8-R2N-BODIPY," J. Org. Chem. 78(9):4245-4250 (2013).
Lakshmi et al., "Funtionalized boron-dipyrromethenes and their applications," Reports in Organic Chemistry 6:1-24 (2016).
Costero et al., "Structure and Conformational Studies of Aza-Crown 8-Amino-BODIPY Derivatives: Influence of Steric Hindrance on Their Photophysical Properties," Eur. J. Org. Chem. 2017(42):6283-6290 (2017).

* cited by examiner

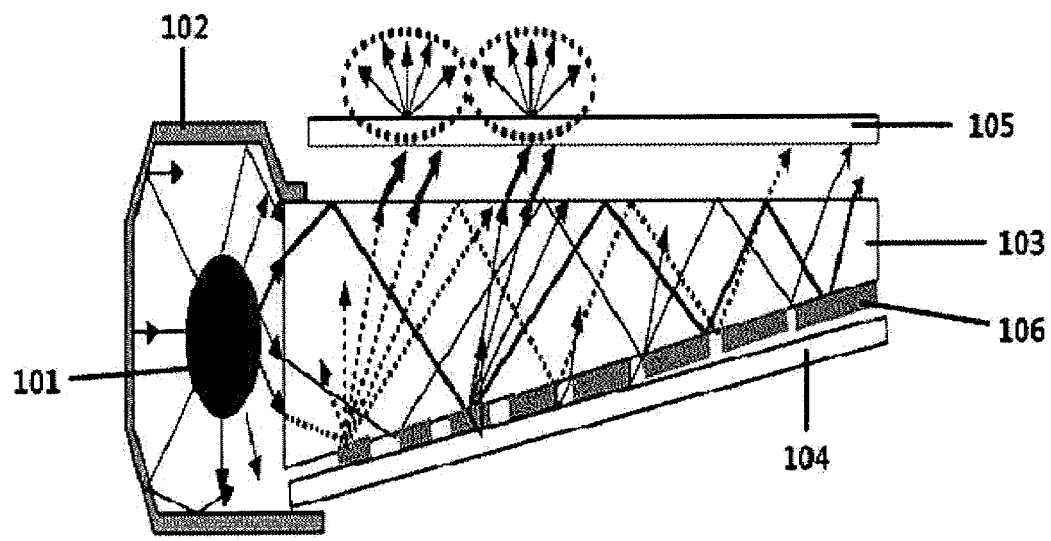

NITROGEN-CONTAINING COMPOUND, COLOR CONVERSION FILM INCLUDING SAME, AND BACKLIGHT UNIT AND DISPLAY DEVICE INCLUDING SAME

CROSS-REFERENCE TO RELATED APPLICATIONS

The present application is a National Stage Application of International Application No. PCT/KR2018/016583 filed on Dec. 24, 2018, which claims priority to and the benefits of Korean Patent Application No. 10-2017-0180922, filed with the Korean Intellectual Property Office on Dec. 27, 2017, the entire contents of which are incorporated herein by reference.

TECHNICAL FIELD

The present specification relates to a nitrogen-containing ring compound, and a color conversion film, a backlight unit and a display device including the same.

The present specification relates to a nitrogen-containing ring compound, and a color conversion film, a backlight unit and a display device including the same.

BACKGROUND ART

Conventional light emitting diodes (LED) are obtained either by mixing a green phosphorescent substance and a red phosphorescent substance with a blue light emitting diode, or mixing a yellow phosphorescent substance and a blue-green phosphorescent substance with a UV-light emitting diode. However, with such a method, it is difficult to control colors and thus color rendering is not favorable. As a result, color reproduction rate (color gamut) is inferior.

In order to overcome such color gamut decline, and reduce production costs, a method of obtaining green and red by filming quantum dots and binding the film to a blue LED has been recently tried. However, cadmium-based quantum dots have safety problems, and other quantum dots have significantly lower efficiency than cadmium-based quantum dots. In addition, quantum dots have a disadvantage in that they have inferior stability for oxygen and water, and the performance thereof is significantly deteriorated, when aggregated. Furthermore, unit production costs are high since maintaining constant sizes is difficult when quantum dots are produced.

Technical Problem

The present specification is directed to providing a nitrogen-containing ring compound, and a color conversion film, a backlight unit and a display device including the same.

Technical Solution

One embodiment of the present specification provides a compound of the following Chemical Formula 1:

[Chemical Formula 1]

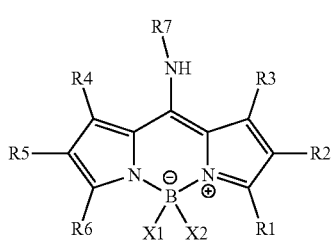

wherein in Chemical Formula 1:

R2 and R5 are identical to or different from one another, and are each independently hydrogen, deuterium, a cyano group, a nitro group, an imide group, an amide group, a carbonyl group, an ester group, a substituted or unsubstituted cycloalkyl group, a substituted or unsubstituted alkoxy group, a substituted or unsubstituted fluoroalkyl group, a substituted or unsubstituted sulfonyl group, a substituted or unsubstituted sulfonamide group, a substituted or unsubstituted aryl group, or a substituted or unsubstituted aryloxy group;

R1, R3, R4, and R6 are identical to or different from one another, and are each independently hydrogen, deuterium, a nitro group, a substituted or unsubstituted alkyl group, a substituted or unsubstituted cycloalkyl group, a substituted or unsubstituted alkoxy group, a substituted or unsubstituted aryloxy group, a substituted or unsubstituted aralkyl group, a substituted or unsubstituted aryl group, a substituted or unsubstituted heteroaryl group, or a substituted or unsubstituted aliphatic heterocyclic group;

R7 is a nitro group, a substituted or unsubstituted alkyl group, a substituted or unsubstituted cycloalkyl group, a substituted or unsubstituted alkoxy group, a substituted or unsubstituted aryloxy group, a substituted or unsubstituted aralkyl group, a substituted or unsubstituted aryl group, a substituted or unsubstituted heteroaryl group, or a substituted or unsubstituted aliphatic heterocyclic group, and X1 and X2 are identical to or different from each other and are each independently a halogen group, a cyano group, a nitro group, an imide group, an amide group, a carbonyl group, an ester group, a substituted or unsubstituted fluoroalkyl group, a substituted or unsubstituted sulfonyl group, a substituted or unsubstituted sulfonamide group, a substituted or unsubstituted alkoxy group, a substituted or unsubstituted aryloxy group, or a substituted or unsubstituted aryl group, or X1 and X2 are bonded together to form a substituted or unsubstituted ring.

Another embodiment of the present specification provides a color conversion film including:

a resin matrix; and the compound of Chemical Formula 1 dispersed in the resin matrix.

Still another embodiment of the present specification provides a backlight unit including the color conversion film.

Yet still another embodiment of the present specification provides a display device including the backlight unit.

Advantageous Effects

The compound according to one embodiment of the present specification is a green light emitting material having not only high fluorescence efficiency in a short wavelength region but also excellent light resistance, when N is bonded to the core structure of Chemical Formula 1. Therefore, a color conversion film with excellent luminance, color reproducibility (color gamut) and superior light resistance can be provided using the compound described in the present specification as a fluorescent substance of the color conversion film.

DESCRIPTION OF DRAWINGS

FIG. 1 is a schematic diagram showing a backlight using a color conversion film according to an embodiment of the present specification.

DESCRIPTION OF ITEM NUMBERS

101: Side-chain type light source
102: Reflective plate
103: Light guide plate
104: Reflective layer
105: Color conversion film
106: Light dispersion pattern

MODE FOR SPECIFICATION

Hereinafter, the present specification will be described in more detail.

An embodiment of the present specification provides the compound of Chemical Formula 1 above.

The compound according to one embodiment of the present specification is characterized in that, when R7 is bonded to the core structure via NH as a linker, light is emitted in a shorter wavelength region than when R7 is directly bonded to the core structure without the NH linker. Further, the compound according to one embodiment of the present specification is characterized in that light is emitted in a longer wavelength region than when R7 is hydrogen. Therefore, the compound according to one embodiment of the present specification satisfies the sRGB color spaces and thus has a high color reproducibility (color gamut).

In the present specification, it will be understood that, when a portion is referred to as "including" one element, the portion can further include another element and does not preclude the presence thereof, unless clearly indicates otherwise.

In the present specification, one member being placed "on" another member includes not only a case of the one member adjoining the another member but a case of still another member being present between the two members.

According to the present specification, examples of substituents will be described below, but the present specification is not limited thereto.

The term "substitution" means that a hydrogen atom bonded to a carbon atom of a compound is changed to another substituent, and the position of substitution is not limited as long as it is a position at which the hydrogen atom is substituted, that is, a position at which a substituent can substitute, and when two or more substituents substitute, the two or more substituents can be identical to or different from each other.

The term "substituted or unsubstituted" in the present specification can mean being substituted with one or more substituents selected from the group consisting of deuterium, a halogen group, a cyano group, a nitro group, a carbonyl group, a carboxyl group (—COOH), an ether group, an ester group, a hydroxyl group, a substituted or unsubstituted alkyl group, a substituted or unsubstituted cycloalkyl group, a substituted or unsubstituted alkoxy group, a substituted or unsubstituted aryloxy group, a substituted or unsubstituted aryl group, and a substituted or unsubstituted heterocyclic group, or being substituted with a substituent linking two or more substituents among the substituents illustrated above, or having no substituents. For example, "a substituent linking two or more substituents" can be a biphenyl group. That is, the biphenyl group can be an aryl group or can be construed as a substituent linking two phenyl groups.

In the present specification,

represents a site bonded to other substituent or bonding portion.

In the present specification, the halogen group can be fluorine, chlorine, bromine or iodine.

In the present specification, the imide group is —C(=O)NR$_{100}$R$_{101}$, wherein R$_{100}$ or R$_{101}$ is identical to or different from each other and can be each independently selected from the group consisting of a halogen group; a nitrile group; a substituted or unsubstituted, monocyclic or polycyclic cycloalkyl group having 3 to 30 carbon atoms; a substituted or unsubstituted, linear or branched alkyl group having 1 to 30 carbon atoms; a substituted or unsubstituted, monocyclic or polycyclic aryl group having 6 to 30 carbon atoms; and a substituted or unsubstituted, monocyclic or polycyclic heteroaryl group having 2 to 30 carbon atoms.

In the present specification, the amide group is —C(=O)NHR$_{102}$, wherein R$_{102}$ can be selected from the group consisting of hydrogen; deuterium; a halogen group; a nitrile group; a substituted or unsubstituted, monocyclic or polycyclic cycloalkyl group having 3 to 30 carbon atoms; a substituted or unsubstituted, linear or branched alkyl group having 1 to 30 carbon atoms; a substituted or unsubstituted, monocyclic or polycyclic aryl group having 6 to 30 carbon atoms; and a substituted or unsubstituted, monocyclic or polycyclic heteroaryl group having 2 to 30 carbon atoms.

In the present specification, the carbonyl group is —C(=O)R$_{103}$, wherein R$_{103}$ can be selected from the group consisting of hydrogen; deuterium; a halogen group; a nitrile group; a substituted or unsubstituted, monocyclic or polycyclic cycloalkyl group having 3 to 30 carbon atoms; a substituted or unsubstituted, linear or branched alkyl group having 1 to 30 carbon atoms; a substituted or unsubstituted, monocyclic or polycyclic aryl group having 6 to 30 carbon atoms; and a substituted or unsubstituted, monocyclic or polycyclic heteroaryl group having 2 to 30 carbon atoms.

In the present specification, the ether group can contain oxygen which is substituted with a linear, branched, or cyclic alkyl group having 1 to 25 carbon atoms, or a monocyclic or polycyclic aryl group having 6 to 30 carbon atoms.

In the present specification, the ester group is —C(=O)OR$_{104}$ or —OC(=O)R$_{105}$, wherein R104 or 8105 is identical to or different from each other and can be each independently selected from the group consisting of a halogen group; a nitrile group; a substituted or unsubstituted, monocyclic or polycyclic cycloalkyl group having 3 to 30 carbon atoms; a substituted or unsubstituted, linear or branched alkyl group having 1 to 30 carbon atoms; a substituted or unsubstituted, linear or branched fluoroalkyl group having 1 to 20 carbon atoms; a substituted or unsubstituted, monocyclic or polycyclic aryl group having 6 to 30 carbon atoms; and a substituted or unsubstituted, monocyclic or polycyclic heteroaryl group having 2 to 30 carbon atoms.

In the present specification, the fluoroalkyl group can be linear or branched, and the number of carbon atoms thereof is not particularly limited, but is preferably 1 to 30. Specifically, examples thereof include a trifluoromethyl group, a perfluoroethyl group and the like, but the present specification is not limited thereto.

In the present specification, the sulfonyl group can be —SO$_2$R$_{106}$, wherein R$_{106}$ can be selected from the group consisting of hydrogen; deuterium; a halogen group; a nitrile group; a substituted or unsubstituted, monocyclic or polycyclic cycloalkyl group having 3 to 30 carbon atoms; a substituted or unsubstituted, linear or branched alkyl group having 1 to 30 carbon atoms; a substituted or unsubstituted, monocyclic or polycyclic aryl group having 6 to 30 carbon atoms; and a substituted or unsubstituted, monocyclic or polycyclic heteroaryl group having 2 to 30 carbon atoms.

In the present specification, the sulfonamide group can be —SO$_2$NR$_{107}$R$_{108}$ or —NR$_{107}$SO$_2$R$_{108}$, wherein R$_{107}$ or Rios is identical to or different from each other and can be each independently selected from the group consisting of hydrogen; deuterium; a halogen group; a nitrile group; a substituted or unsubstituted, monocyclic or polycyclic cycloalkyl group having 3 to 30 carbon atoms; a substituted or unsubstituted, linear or branched alkyl group having 1 to 30 carbon atoms; a substituted or unsubstituted, monocyclic or polycyclic aryl group having 6 to 30 carbon atoms; and a substituted or unsubstituted, monocyclic or polycyclic heteroaryl group having 2 to 30 carbon atoms.

In the present specification, the alkyl group can be linear or branched, or the number of carbon atoms thereof is not particularly limited, but is preferably 1 to 30. Specifically, examples of the alkyl group include, but are not limited to, methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethylpropyl, 1,1-dimethylpropyl, isohexyl, 2-methylpentyl, 4-methylhexyl, 5-methylhexyl and the like.

In the present specification, the cycloalkyl group is not particularly limited, but the number of carbon atoms thereof is preferably 3 to 30. Specifically, examples of the cycloalkyl group include, but are not limited to, cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like.

In the present specification, the alkoxy group can be linear, branched or cyclic. The number of carbon atoms of the alkoxy group is not particularly limited, but is preferably 1 to 30. Specifically, examples thereof include, but are not limited to, methoxy, ethoxy, n-propoxy, isopropoxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy and the like.

In the present specification, the aralkyl group means an alkyl group substituted with an aryl group, and the number of carbon atoms thereof is preferably 6 to 30. Specifically, examples thereof include a benzyl group, an alpha-methyl benzyl group and an alpha-ethyl benzyl group, and are not particularly limited thereto.

In the present specification, the aryl group is not particularly limited, but the number of carbon atoms thereof is preferably 6 to 30, and the aryl group can be monocyclic or polycyclic.

When the aryl group is a monocyclic aryl group, the number of carbon atoms thereof is not particularly limited, but is preferably 6 to 30. Specifically, examples of the monocyclic aryl group include, but are not limited to, a phenyl group, a biphenyl group, a terphenyl group and the like.

When the aryl group is a polycyclic aryl group, the number of carbon atoms thereof is not particularly limited, but is preferably 10 to 30. Specifically, examples of the polycyclic aryl group include, but are not limited to, a naphthyl group, an anthracenyl group, a phenanthryl group, a triphenyl group, a pyrenyl group, a perylenyl group, a chrysenyl group, a fluorenyl group and the like.

In the present specification, the fluorenyl group can be substituted, and adjacent substituents can be bonded together to form a ring.

When the fluorenyl group is substituted, it can be

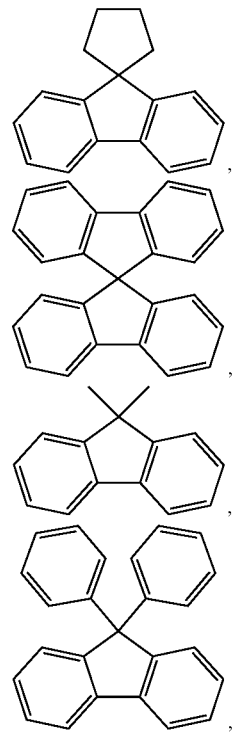

or the like, but the present specification is not limited thereto.

In the present specification, examples of the aryl group of the aryloxy group are the same as examples of the aryl group described above. Specifically, examples of the aryloxy group include a phenoxy group, a p-tolyloxy group, a m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group and the like, examples of the arylthioxy group include, but are not limited to, a phenylthioxy group, a 2-methylphenylthioxy group, a 4-tert-butylphenylthioxy group and the like, and examples of the arylsulfoxy group include, but are not limited to, a benzenesulfoxy group, a p-toluenesulfoxy group and the like.

In the present specification, the heteroaryl group includes at least one heteroatom, which is an atom excluding carbon. Specifically, the heteroatom can include at least one atom selected from the group consisting of O, N, Se, and S. The number of carbon atoms of the heteroaryl group is not particularly limited, but is preferably 2 to 30. The heteroaryl group can be monocyclic or polycyclic. Examples of the heteroaryl group include, but are not limited to, a thiophene group, a furanyl group, a pyrrolyl group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophenyl group, a dibenzothiophenyl group, a benzofuranyl group, a phenanthrolinyl group, an isoxazolyl group, a thiadiazolyl group, a phenothiazinyl group, a dibenzofuranyl group and the like.

In the present specification, the heterocyclic group can be monocyclic or polycyclic, can be aromatic, aliphatic, or a condensed ring of aromatic and aliphatic compounds, and can be selected from examples of the heteroaryl group.

In the present specification, the aliphatic heterocyclic group can be monocyclic or polycyclic, and specifically, the aliphatic heterocyclic group can be a tetrahydropyranyl group, but is not limited thereto.

In one embodiment of the present specification, R7 is a substituted or unsubstituted alkyl group having 1 to 20 carbon atoms, a substituted or unsubstituted cycloalkyl group having 3 to 30 carbon atoms, or a substituted or unsubstituted aralkyl group having 6 to 30 carbon atoms.

In one embodiment of the present specification, R7 is a substituted or unsubstituted alkyl group having 1 to 20 carbon atoms, or a substituted or unsubstituted aralkyl group having 6 to 30 carbon atoms.

In one embodiment of the present specification, R7 is a substituted or unsubstituted alkyl group having 1 to 20 carbon atoms; or a substituted or unsubstituted aralkyl group having 6 to 30 carbon atoms.

In one embodiment of the present specification, R7 is a substituted or unsubstituted alkyl group having 1 to 20 carbon atoms.

In one embodiment of the present specification, R7 is a substituted or unsubstituted alkyl group having 1 to 10 carbon atoms.

In one embodiment of the present specification, R7 is a substituted or unsubstituted alkyl group having 1 to 5 carbon atoms.

In one embodiment of the present specification, R7 is a methyl group, an ethyl group, a propyl group, or a butyl group.

In one embodiment of the present specification, R7 is a methyl group, an ethyl group, an iso-propyl group, or a tert-butyl group.

In one embodiment of the present specification, R7 is an alkyl group substituted with an aryl group.

In one embodiment of the present specification, R7 is a methyl group substituted with a phenyl group, an ethyl group substituted with a phenyl group, or a propyl group substituted with a phenyl group.

In one embodiment of the present specification, R7 is a substituted or unsubstituted cycloalkyl group having 3 to 30 carbon atoms.

In one embodiment of the present specification, R7 is a substituted or unsubstituted cyclohexyl group.

In one embodiment of the present specification, R7 is a cyclohexyl group.

In one embodiment of the present specification, R7 is a substituted or unsubstituted aralkyl group having 6 to 30 carbon atoms.

In one embodiment of the present specification, R7 is a substituted or unsubstituted benzyl group.

In one embodiment of the present specification, R7 is an aralkyl group unsubstituted or substituted with an alkyl group.

In one embodiment of the present specification, R7 is a benzyl group unsubstituted or substituted with a methyl group or an ethyl group.

In one embodiment of the present specification, R7 is an alpha-methylbenzyl group, or an alpha-ethylbenzyl group, or a benzyl group.

In one embodiment of the present specification, R1, R3, R4, and R6 are identical to or different from one another, and are each independently hydrogen, a substituted or unsubstituted alkyl group, a substituted or unsubstituted alkoxy group, a substituted or unsubstituted aryloxy group, a substituted or unsubstituted cycloalkyl group, a substituted or unsubstituted aryl group, a substituted or unsubstituted heteroaryl group, or a substituted or unsubstituted aliphatic heterocyclic group.

In one embodiment of the present specification, R1, R3, R4, and R6 are identical to or different from one another, and are each independently hydrogen, a substituted or unsubstituted methyl group, a substituted or unsubstituted phenoxy group, a substituted or unsubstituted cyclohexyl group, a substituted or unsubstituted cyclopentyl group, a substituted or unsubstituted cycloheptyl group, a substituted or unsubstituted cyclooctyl group, a substituted or unsubstituted bicycloheptyl group, a substituted or unsubstituted bicyclooctyl group, a substituted or unsubstituted adamantane group, a substituted or unsubstituted tetrahydropyranyl group, a substituted or unsubstituted phenyl group, or a substituted or unsubstituted naphthyl group.

In one embodiment of the present specification, R1, R3, R4, and R6 are identical to or different from one another, and are each independently hydrogen; a methyl group; a phenoxy group unsubstituted or substituted with an alkyl group, an aryl group or a cyano group; a cyclohexyl group unsubstituted or substituted with an alkyl group, an aryl group or an alkoxy group; a cyclopentyl group; a cycloheptyl group; a cyclooctyl group; a bicycloheptyl group unsubstituted or substituted with an aryl group; a bicyclooctyl group; an adamantane group; a tetrahydropyranyl group; or a phenyl group.

In one embodiment of the present specification, R1, R3, R4, and R6 are identical to or different from one another, and are each independently hydrogen; a methyl group; a phenoxy group unsubstituted or substituted with a propyl group, a phenyl group, or a cyano group; a cyclohexyl group unsubstituted or substituted with a methyl group, an ethyl group, a phenyl group or a methoxy group; a cyclopentyl group; a cycloheptyl group; a cyclooctyl group; a bicycloheptyl group unsubstituted or substituted with a phenyl group; an adamantane group; a tetrahydropyranyl group; or a phenyl group.

In one embodiment of the present specification, when R1, R3, R4 and R6 are cyclohexyl groups, the compound becomes bulky and the stability of the compound is improved and, when R1, R3, R4 and R6 are cyclohexyl groups substituted with a substituent such as a methyl group, an ethyl group or a phenyl group, the stability of the compound is further improved, so that the compound advantageously has excellent durability when used for a color conversion film.

In one embodiment of the present specification, R2 and R5 are different from each other.

In one embodiment of the present specification, R2 and R5 are identical to each other.

In one embodiment of the present specification, R2 and R5 are identical to or different from each other and are each independently an electron-withdrawing group or hydrogen.

In one embodiment of the present specification, R2 and R5 are identical to or different from each other and are each independently hydrogen, a cyano group, a nitro group, an ester group, an amide group, a sulfonyl group, a fluoroalkyl group, or a phenyl group.

In one embodiment of the present specification, R2 and R5 are identical to or different from each other and are each independently hydrogen, —CN, —NO$_2$, —COOC$_2$H$_5$, —CON(CH$_3$)$_2$, —CONH(C$_2$H$_5$), —CF$_3$, —SO$_3$C$_2$H$_5$, —COOCH$_2$CF$_2$CF$_2$CF$_3$, or a phenyl group.

In one embodiment of the present specification, R2 and R5 are identical to or different from each other and are each independently hydrogen, —CN, or —COOCH$_2$CF$_2$CF$_2$CF$_3$.

In one embodiment of the present specification, R$_2$ is a cyano group, a nitro group, an imide group, an amide group, a carbonyl group, an ester group, a substituted or unsubstituted fluoroalkyl group, a substituted or unsubstituted sulfonyl group, or a substituted or unsubstituted sulfonamide group, and R5 is hydrogen, deuterium, a substituted or unsubstituted alkyl group, a substituted or unsubstituted cycloalkyl group, a substituted or unsubstituted alkoxy group, a substituted or unsubstituted aryloxy group, or a substituted or unsubstituted aryl group.

In one embodiment of the present specification, R2 is an electron withdrawing group and R5 is hydrogen.

In one embodiment of the present specification, R2 is a cyano group, a nitro group, an ester group, an amide group, a sulfonyl group, a fluoroalkyl group, or a phenyl group.

In one embodiment of the present specification, R2 is —CN, —NO$_2$, —COOC$_2$H$_5$, —CON(CH$_3$)$_2$, —CONH(C$_2$H$_5$), —CF$_3$, —SO$_3$C$_2$H$_5$, —COOCH$_2$CF$_2$CF$_2$CF$_3$, or a phenyl group.

In one embodiment of the present specification, R2 is —CN or —COOCH$_2$CF$_2$C$_F$2CF$_3$.

In one embodiment of the present specification, R2 is a cyano group or a fluoroalkyl group.

In one embodiment of the present specification, R2 is a cyano group or —CF$_3$.

In one embodiment of the present specification, R2 is a cyano group.

In one embodiment of the present specification, R5 is hydrogen, deuterium, or a phenyl group.

In one embodiment of the present specification, R5 is hydrogen or deuterium.

In one embodiment of the present specification, R5 is hydrogen.

In one embodiment of the present specification, R2 and R5 are phenyl groups.

In one embodiment of the present specification, X1 and X2 are identical to or different from each other, and are each —F, a nitro group, a cyano group, —CO$_2$CH$_3$, —OCOCH$_3$, —SO$_3$H, —CF$_3$, —OCH$_3$ or —OC$_6$H$_5$.

In one embodiment of the present specification, X1 and X2 are identical to or different from each other and are each F or CN.

In one embodiment of the present specification, X1 and X2 are F or CN.

In one embodiment of the present specification, X1 and X2 are CN.

In one embodiment of the present specification, X1 and X2 are F.

In one embodiment of the present specification, R1, R3, R4 and R6 can be selected from the following Table 1, R2 and R5 can be selected from the following Table 2, R7 can be selected from the following Table 3, and X1 and X2 can be selected from Table 4.

TABLE 1

| Combination | R1 | R3 | R4 | R6 |
|---|---|---|---|---|
| 1A | cyclohexyl | cyclohexyl | cyclohexyl | cyclohexyl |
| 2A | 2-methylcyclohexyl | 2-methylcyclohexyl | 2-methylcyclohexyl | 2-methylcyclohexyl |

TABLE 1-continued
| Combination | R1 | R3 | R4 | R6 |
|---|---|---|---|---|
| 3A | 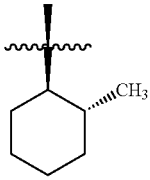 | 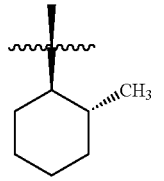 [SMILES: *[C@@H]1CCCC[C@H]1C] | 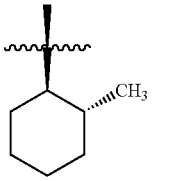 [SMILES: *[C@@H]1CCCC[C@H]1C] | 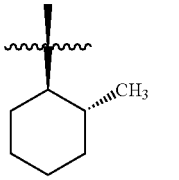 [SMILES: *[C@@H]1CCCC[C@H]1C] |
| 4A | 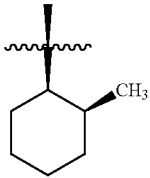 | 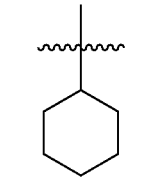 | 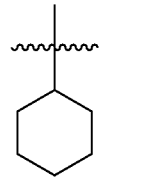 | 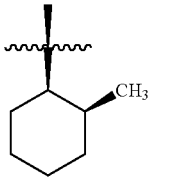 [SMILES: *[C@@H]1CCCC[C@@H]1C] |
| 5A | 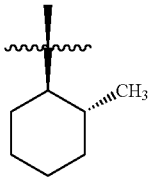 | 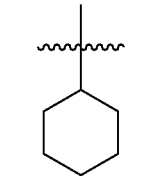 | 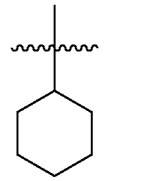 [SMILES: *C1CCCCC1] | 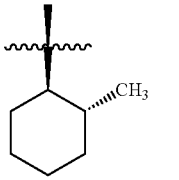 [SMILES: *[C@@H]1CCCC[C@H]1C] |
| 6A | 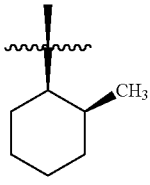 | 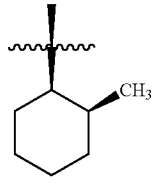 [SMILES: *[C@@H]1CCCC[C@@H]1C] | 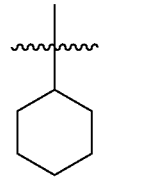 | 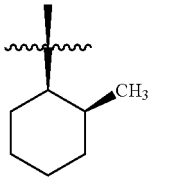 [SMILES: *[C@@H]1CCCC[C@@H]1C] |
| 7A | 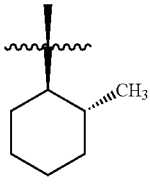 | 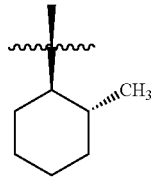 [SMILES: *[C@@H]1CCCC[C@H]1C] | 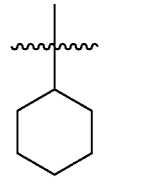 | 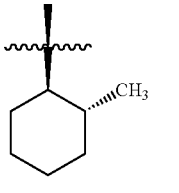 [SMILES: *[C@@H]1CCCC[C@H]1C] |
| 8A | 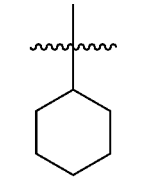 [SMILES: *C1CCCCC1] | 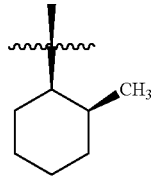 [SMILES: *[C@@H]1CCCC[C@@H]1C] | 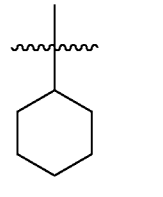 | 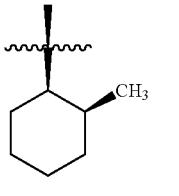 [SMILES: *[C@@H]1CCCC[C@@H]1C] |
| 9A | 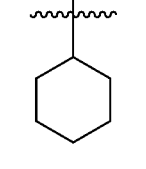 | 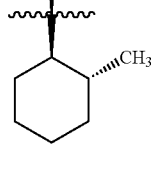 | 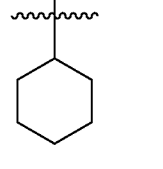 | 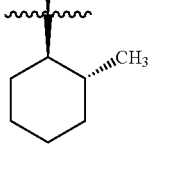 |
| 10A | 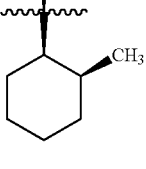 | —CH$_3$ | —CH$_3$ | 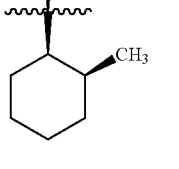 |

TABLE 1-continued

| Combination | R1 | R3 | R4 | R6 |
|---|---|---|---|---|
| 11A | trans-2-methylcyclohexyl | —CH₃ | —CH₃ | trans-2-methylcyclohexyl |
| 12A | cyclohexyl | —CH₃ | —CH₃ | trans-2-methylcyclohexyl |
| 13A | cyclohexyl | —CH₃ | —CH₃ | trans-2-methylcyclohexyl |
| 14A | cyclopentyl | cyclopentyl | cyclopentyl | cyclopentyl |
| 15A | cyclopentyl | cyclopentyl | cyclohexyl | cyclopentyl |
| 16A | cycloheptyl | cycloheptyl | cycloheptyl | cycloheptyl |
| 17A | cycloheptyl | cyclohexyl | cycloheptyl | cycloheptyl |
| 18A | cycloheptyl | cyclohexyl | cyclohexyl | cycloheptyl |

TABLE 1-continued
| Combination | R1 | R3 | R4 | R6 |
|---|---|---|---|---|
| 19A | 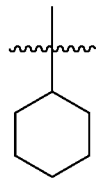 [SMILES: *C1CCCCC1] | 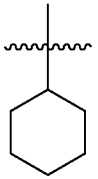 | 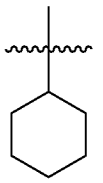 | 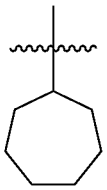 [SMILES: *C1CCCCCC1] |
| 20A | 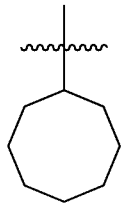 [SMILES: *C1CCCCCCC1] | 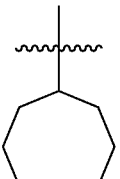 | 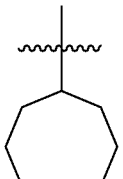 | 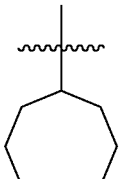 |
| 21A | 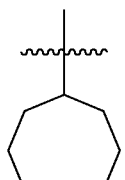 | 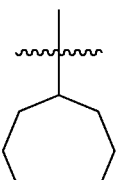 | 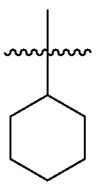 | 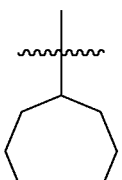 |
| 22A | 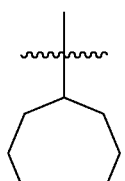 | 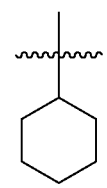 | 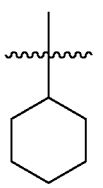 | 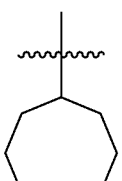 |
| 23A | 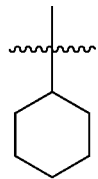 [SMILES: *C1CCCCC1] | 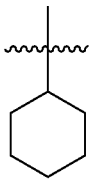 [SMILES: *C1CCCCC1] | 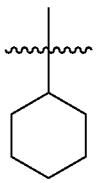 | 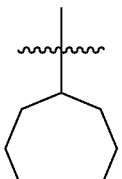 |
| 24A | 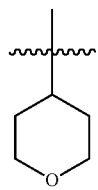 [SMILES: *C1CCOCC1] | 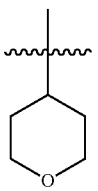 | 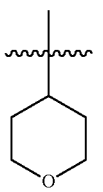 | 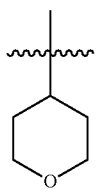 |
| 25A | 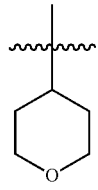 [SMILES: *C1CCOCC1] | 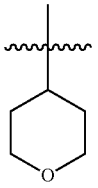 | 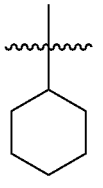 | 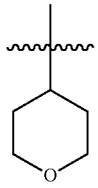 |

TABLE 1-continued

| Combination | R1 | R3 | R4 | R6 |
|---|---|---|---|---|
| 26A | tetrahydropyran-4-yl | cyclohexyl | cyclohexyl | tetrahydropyran-4-yl |
| 27A | cyclohexyl | cyclohexyl | cyclohexyl | tetrahydropyran-4-yl |
| 28A | bicyclo[2.1.1]hexyl | bicyclo[2.1.1]hexyl | bicyclo[2.1.1]hexyl | bicyclo[2.1.1]hexyl |
| 29A | bicyclo[2.1.1]hexyl | cyclohexyl | bicyclo[2.1.1]hexyl | bicyclo[2.1.1]hexyl |
| 30A | bicyclo[2.1.1]hexyl | cyclohexyl | cyclohexyl | bicyclo[2.1.1]hexyl |
| 31A | cyclohexyl | cyclohexyl | cyclohexyl | bicyclo[2.1.1]hexyl |
| 32A | 2-methylcyclohexyl | cyclohexyl | cyclohexyl | bicyclo[2.1.1]hexyl |
| 33A | 2-methylcyclohexyl | cycloheptyl | cyclohexyl | bicyclo[2.1.1]hexyl |

TABLE 1-continued

| Combination | R1 | R3 | R4 | R6 |
|---|---|---|---|---|
| 34A | 2-phenylnorbornyl | 2-phenylnorbornyl | 2-phenylnorbornyl | 2-phenylnorbornyl |
| 35A | 2-phenylnorbornyl | cyclohexyl | cyclohexyl | 2-phenylnorbornyl |
| 36A | adamantyl | cyclohexyl | cyclohexyl | adamantyl |
| 37A | cyclohexyl | cyclohexyl | cyclohexyl | adamantyl |
| 38A | adamantyl | —CH$_3$ | —CH$_3$ | adamantyl |
| 39A | adamantyl | —CH$_3$ | cyclohexyl | adamantyl |
| 40A | 2-methoxycyclohexyl | 2-methoxycyclohexyl | 2-methoxycyclohexyl | 2-methoxycyclohexyl |

TABLE 1-continued

| Combination | R1 | R3 | R4 | R6 |
|---|---|---|---|---|
| 41A | cyclohexyl-OCH₃ | cyclohexyl-OCH₃ | cyclohexyl-OCH₃ | cyclohexyl-OCH₃ |
| 42A | cyclohexyl-OCH₃ | cyclohexyl-OCH₃ | cyclohexyl | cyclohexyl-OCH₃ |
| 43A | cyclohexyl-OCH₃ | cyclohexyl-OCH₃ | cyclohexyl | cyclohexyl-OCH₃ |
| 44A | cyclohexyl-OCH₃ | cyclohexyl | cyclohexyl | cyclohexyl-OCH₃ |
| 45A | cyclohexyl-OCH₃ | cyclohexyl | cyclohexyl | cyclohexyl-OCH₃ |
| 46A | cyclohexyl | cyclohexyl | cyclohexyl | cyclohexyl-OCH₃ |
| 47A | cyclohexyl | cyclohexyl | cyclohexyl | cyclohexyl-OCH₃ |
| 48A | cyclohexyl | cyclohexyl-OCH₃ | cyclohexyl | cyclohexyl-OCH₃ |

TABLE 1-continued
| Combination | R1 | R3 | R4 | R6 |
|---|---|---|---|---|
| 49A | 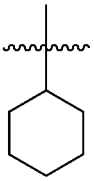 [SMILES: *C1CCCCC1] | 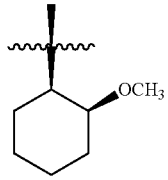 [SMILES: *[C@@H]1CCCC[C@@H]1OC] | 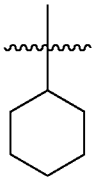 | 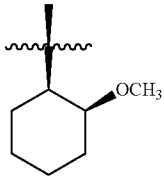 [SMILES: *[C@@H]1CCCC[C@@H]1OC] |
| 50A | 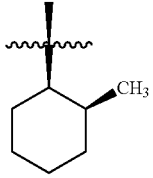 [SMILES: *[C@@H]1CCCC[C@@H]1C] | 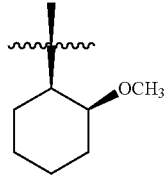 [SMILES: *[C@@H]1CCCC[C@@H]1OC] | 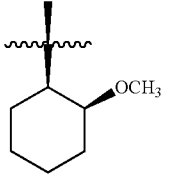 | 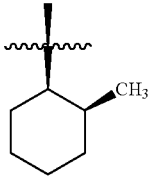 [SMILES: *[C@@H]1CCCC[C@@H]1C] |
| 51A | 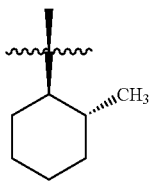 | 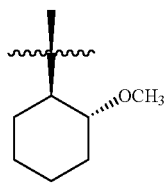 [SMILES: *[C@@H]1CCCC[C@H]1OC] | 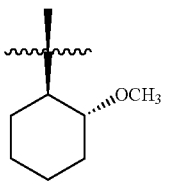 [SMILES: *[C@@H]1CCCC[C@H]1OC] | 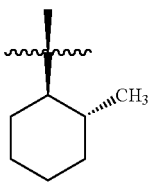 [SMILES: *[C@@H]1CCCC[C@H]1C] |
| 52A | 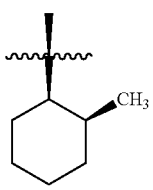 [SMILES: *[C@@H]1CCCC[C@@H]1C] | 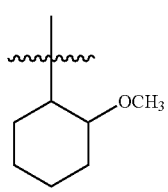 [SMILES: *C1CCCCC1OC] | 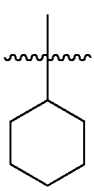 | 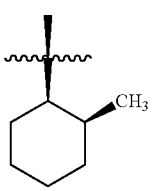 [SMILES: *[C@@H]1CCCC[C@@H]1C] |
| 53A | 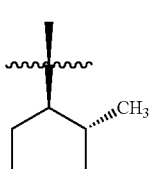 | 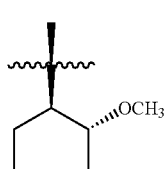 | 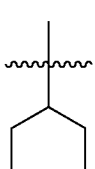 | 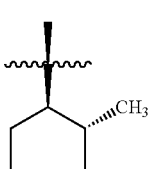 |
| 54A | 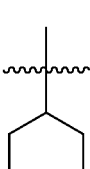 | 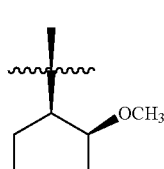 | 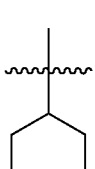 | 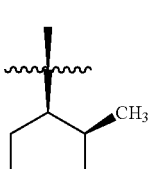 |
| 55A | 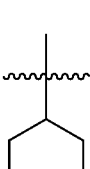 | 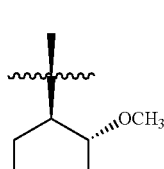 | 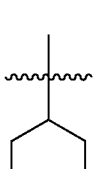 | 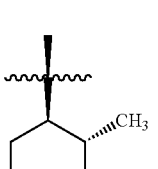 |
| 58A | 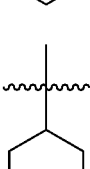 | —H | —H | 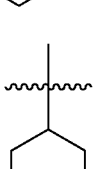 |

TABLE 1-continued

| Combination | R1 | R3 | R4 | R6 |
|---|---|---|---|---|
| 59A | 2-methylcyclohexyl (wedge) | —H | —H | 2-methylcyclohexyl (wedge) |
| 60A | 2-methylcyclohexyl (dash) | —H | —H | 2-methylcyclohexyl (dash) |
| 61A | cyclohexyl | —H | —H | 2-methylcyclohexyl (dash) |
| 62A | cyclohexyl | —H | —H | 2-methylcyclohexyl (wedge) |
| 63A | cyclopentyl | —H | —H | cyclopentyl |
| 64A | cycloheptyl | —H | —H | cycloheptyl |
| 65A | cyclohexyl | —H | —H | cycloheptyl |
| 66A | cyclooctyl | —H | —H | cyclooctyl |

TABLE 1-continued

| Combination | R1 | R3 | R4 | R6 |
|---|---|---|---|---|
| 67A | cyclohexyl | —H | —H | cyclooctyl |
| 68A | tetrahydropyran-4-yl | —H | —H | tetrahydropyran-4-yl |
| 69A | cyclohexyl | —H | —H | tetrahydropyran-4-yl |
| 70A | norbornyl | —H | —H | norbornyl |
| 71A | cyclohexyl | —H | —H | norbornyl |
| 72A | trans-2-methylcyclohexyl | —H | —H | norbornyl |
| 73A | 2-phenylnorbornyl | —H | —H | 2-phenylnorbornyl |

TABLE 1-continued
| Combination | R1 | R3 | R4 | R6 |
|---|---|---|---|---|
| 74A | 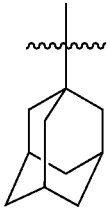 | —H | —H | 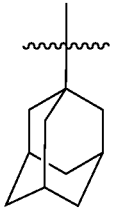 [SMILES: *C12CC3CC(CC(C3)C1)C2] |
| 75A | 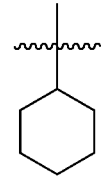 [SMILES: *C1CCCCC1] | —H | —H | 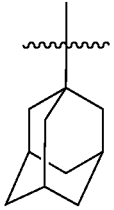 [SMILES: *C12CC3CC(CC(C3)C1)C2] |
| 76A | 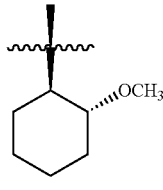 [SMILES: *[C@@H]1CCCC[C@H]1OC] | —H | —H | 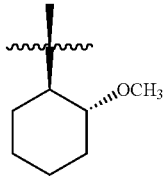 [SMILES: *[C@@H]1CCCC[C@H]1OC] |
| 77A | 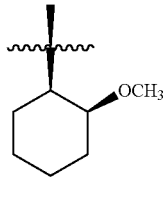 [SMILES: *[C@@H]1CCCC[C@@H]1OC] | —H | —H | 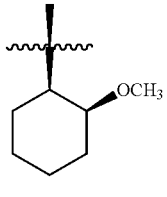 [SMILES: *[C@@H]1CCCC[C@@H]1OC] |
| 78A | 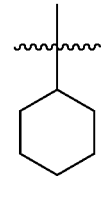 [SMILES: *C1CCCCC1] | —H | —H | 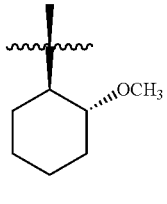 [SMILES: *[C@@H]1CCCC[C@H]1OC] |
| 79A | 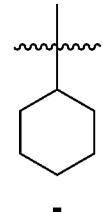 | —H | —H | 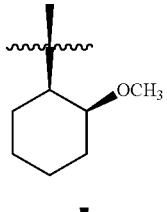 |
| 80A | 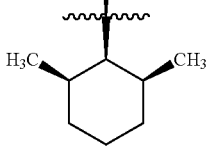 | —H | —H | 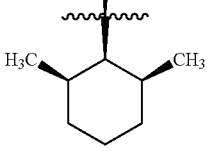 |
| 81A | 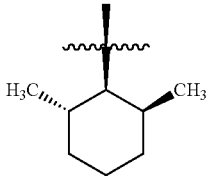 | —H | —H | 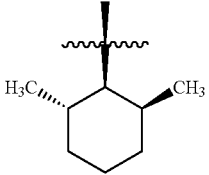 |

TABLE 1-continued

| Combination | R1 | R3 | R4 | R6 |
|---|---|---|---|---|
| 82A | 4-tetrahydropyranyl | 4-tetrahydropyranyl | 4-tetrahydropyranyl | 4-tetrahydropyranyl |
| 83A | 2-ethylcyclohexyl | 2-ethylcyclohexyl | 2-ethylcyclohexyl | 2-ethylcyclohexyl |
| 84A | 2-isopropylcyclohexyl | 2-isopropylcyclohexyl | 2-isopropylcyclohexyl | 2-isopropylcyclohexyl |
| 85A | 2-isopropylcyclohexyl | —H | —H | 2-isopropylcyclohexyl |
| 86A | 2-phenylcyclohexyl | 2-phenylcyclohexyl | 2-phenylcyclohexyl | 2-phenylcyclohexyl |
| 87A | 2-phenylcyclohexyl | —H | —H | 2-phenylcyclohexyl |
| 88A | phenoxymethyl | phenoxymethyl | phenoxymethyl | phenoxymethyl |
| 89A | phenoxymethyl | —H | —H | phenoxymethyl |

TABLE 1-continued

| Combination | R1 | R3 | R4 | R6 |
|---|---|---|---|---|
| 90A | 2,6-diisopropylphenoxy | 2,6-diisopropylphenoxy | 2,6-diisopropylphenoxy | 2,6-diisopropylphenoxy |
| 91A | 2,6-diisopropylphenoxy | —H | —H | 2,6-diisopropylphenoxy |
| 92A | 2,6-diphenylphenoxy | 2,6-diphenylphenoxy | 2,6-diphenylphenoxy | 2,6-diphenylphenoxy |
| 93A | 2,6-diphenylphenoxy | —H | —H | 2,6-diphenylphenoxy |
| 94A | 4-cyano-2,6-diphenylphenoxy | 4-cyano-2,6-diphenylphenoxy | 4-cyano-2,6-diphenylphenoxy | 4-cyano-2,6-diphenylphenoxy |
| 95A | 4-cyano-2,6-diphenylphenoxy | —H | —H | 4-cyano-2,6-diphenylphenoxy |
| 96A | —C$_6$H$_5$ | —C$_6$H$_5$ | —C$_6$H$_5$ | —C$_6$H$_5$ |
| 97A | —C$_6$H$_5$ | —H | —H | —C$_6$H$_5$ |

TABLE 2

| combination | R2 | R5 |
|---|---|---|
| 1B | —CN | —H |
| 2B | —CN | —CN |
| 3B | —COOC$_2$H$_5$ | —H |
| 4B | —COOC$_2$H$_5$ | —COOC$_2$H$_5$ |
| 5B | —CON(CH$_3$)$_2$ | —H |
| 6B | —CON(CH$_3$)$_2$ | —CON(CH$_3$)$_2$ |
| 7B | —CONH(C$_2$H$_5$) | H |
| 8B | —CONH(C$_2$H$_5$) | —CONH(C$_2$H$_5$) |
| 9B | —CF$_3$ | —H |
| 10B | —CF$_3$ | —CF$_3$ |
| 11B | —SO$_3$C$_2$H$_5$ | —H |
| 12B | —SO$_3$C$_2$H$_5$ | —SO$_3$C$_2$H$_5$ |
| 13B | —NO$_2$ | —H |
| 14B | —NO$_2$ | —NO$_2$ |

TABLE 2-continued

| combination | R2 | R5 |
|---|---|---|
| 15B | (acyl-OCH2C(CF3)2CF2CF3 structure) | —H |
| 16B | (acyl-OCH2C(CF3)2CF2CF3 structure) | (acyl-OCH2C(CF3)2CF2CF3 structure) |
| 17B | —C6H5 | —C6H5 |
| 18B | —C6H5 | —CN |

TABLE 3

| combination | R7 |
|---|---|
| 2C | —CH6 |
| 3C | —CH2CH6 |
| 4C | (isopropyl) |
| 5C | (tert-butyl) |
| 6C | (cyclohexylmethyl) |
| 7C | (benzyl) |
| 8C | (1-phenylethyl) |
| 9C | (1-phenylpropyl) |

TABLE 4

| Combination | X1 | X2 |
|---|---|---|
| 1D | —F | —F |
| 2D | —CN | —CN |
| 3D | —F | —CN |
| 4D | —NO2 | —NO2 |
| 5D | —CO2CH3 | —CO2CH3 |
| 6D | —OCOCH3 | —OCOCH3 |
| 7D | —CF3 | —CF3 |
| 8D | —SO3C2H5 | —SO3C2H5 |
| 9D | —OCH3 | —OCH3 |
| 10D | —OC6H5 | —OC6H5 |

In one embodiment of the present specification, the compound of Chemical Formula 1 has a 1 nm to 30 nm lower maximum absorption peak than the compound wherein R1 to R7, X1 and X2 are the same as in the compound of Chemical Formula 1 except that a direct bond is used instead of the NH linker. Specifically, the maximum absorption peak of the compound of the present specification is 1 nm to 30 nm lower than that of the compound wherein R7 is directly bonded (Formula AA shown below) and R1 to R7, X1 and X2 are the same as in the compound of Chemical Formula 1.

In one embodiment of the present specification, the compound of Chemical Formula 1 has a 1 nm to 100 nm lower maximum emission peak than the compound wherein R1 to R7, X1 and X2 are the same as in the compound of Chemical Formula 1 except that a direct bond is used instead of the NH linker. Specifically, the maximum emission peak of the compound of the present specification is 1 nm to 100 nm lower than that of the compound wherein R7 is directly bonded (Formula AA below) and R1 to R7, X1 and X2 are the same as in the compound of Chemical Formula 1.

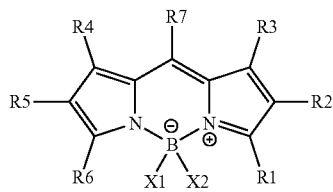

[Chemical Formula AA]

In one embodiment, the present specification provides a color conversion film including:
a resin matrix; and
the compound of Chemical Formula 1 dispersed in the resin matrix.

The content of the compound represented by of Chemical Formula 1 in the color conversion film can be within the range of 0.001 to 10% by weight.

The color conversion film can contain one or two or more kinds of the compounds of Chemical Formula 1.

The color conversion film can further include a fluorescent substance, in addition to the compound of Chemical Formula 1. When a light source emitting blue light is used, the color conversion film preferably includes both a green light-emitting fluorescent material and a red light-emitting fluorescent material. In addition, when a light source emitting blue light and green light is used, the color conversion film can include only a red light-emitting fluorescent material. However, the present invention is not limited thereto and, in the case of laminating a separate film containing a green light-emitting fluorescent material, even when using a light source emitting blue light, the color conversion film can include only a red light-emitting compound. Conversely, in the case of laminating a separate film containing a red light-emitting fluorescent material, even when using a light source emitting blue light, the color conversion film can include only a green light-emitting compound.

The color conversion film can further include an additional layer including a resin matrix and a compound dispersed in the resin matrix and emitting light with a wavelength different from that of the compound represented by of Chemical Formula 1. The compound emitting light with a wavelength different from that of the compound represented by of Chemical Formula 1 can also be the compound represented by of Chemical Formula 1 or other known fluorescent material.

The material of the resin matrix is preferably a thermoplastic polymer or a thermosetting polymer. Specifically, examples of the material for the resin matrix include poly(meth)acryl such as polymethylmethacrylate (PMMA), polycarbonate (PC), polystyrene (PS), polyarylene (PAR), polyurethane (TPU), styrene-acrylonitrile (SAN), polyvinylidene fluoride (PVDF), modified polyvinylidene fluoride (modified-PVDF) and the like.

In one embodiment of the present specification, the color conversion film according to the aforementioned embodiment further includes light diffusion particles. By dispersing the light diffusion particles in the color conversion film, instead of conventional light diffusion films in order to improve the brightness, the adhesion process can be omitted and higher brightness can be obtained, as compared to the use of a separate light diffusion film.

The light diffusion particles herein used can be particles having a high refractive index with the resin matrix, and examples thereof include $TiO_2$, silica, borosilicate, alumina, sapphire, air or other gases, air- or gas-filled porous beads or particles (for example, air/gas-filled glass or polymer); polymer), polymer particles including polystyrene, polycarbonate, polymethylmethacrylate, acryl, methylmethacrylate, styrene, a melamine resin, a formaldehyde resin, or melamine and formaldehyde resins, or any suitable combination thereof.

The light diffusion particles can have a particle diameter within the range of 0.1 micrometers to 5 micrometers, for example, within the range of 0.3 micrometers to 1 micrometer. The content of the light diffusion particles can be determined as necessary, and for example, can be within the range of approximately 1 to 30 parts by weight, based on 100 parts by weight of the resin matrix.

The color conversion film according to the embodiments described above can have a thickness of 2 micrometers to 200 micrometers. Particularly, the color conversion film can exhibit high luminance even with a small thickness of 2 micrometers to 20 micrometers. This is due to the fact that the content of the fluorescent material molecules included in the unit volume is higher than the content of quantum dots.

The color conversion film according to the embodiments described above can be provided with a substrate on one surface thereof. This substrate can serve as a support when producing the color conversion film. The type of the substrate is not particularly limited, and materials and thicknesses thereof are not limited as long as the substrate is transparent and capable of serving as a support. Herein, the term "transparent" means that visible light ray transmissivity is 70% or more. For example, a PET film can be used as the substrate.

The color conversion film described above can be prepared by coating a substrate with a resin solution, in which the compound of Chemical Formula 1 described above is dissolved, and drying the resulting substrate, or extruding the compound of Chemical Formula 1 described above with a resin, followed by filming.

Since the compound of Chemical Formula 1 described above is dissolved in the resin solution, the compound of Chemical Formula 1 is homogeneously distributed in the solution. This is different from a quantum dot film preparation process requiring a separate dispersion process.

The preparation method of the resin solution, in which the compound of Chemical Formula 1 is dissolved, is not particularly limited as long as the compound of Chemical Formula 1 described above is dissolved in the resin solution. For example, the resin solution, in which the compound of Chemical Formula 1 is dissolved, can be prepared by dissolving the compound of Chemical Formula 1 in a solvent to a prepare a first solution, dissolving a resin in a solvent to prepare a second solution, and mixing the first solution with the second solution. When the first solution and the second solution are mixed, these preferably are homogeneously mixed. However, the method is not limited thereto, and a method of adding and dissolving the compound of Chemical Formula 1 and a resin in a solvent at the same time, a method of dissolving the compound of Chemical Formula 1 in a solvent and then adding and dissolving a resin thereto, a method of dissolving a resin in a solvent and then adding and dissolving the compound of Chemical Formula 1 thereto, and the like, can be used.

The resin included in the solution can be the resin matrix material described above, a monomer being curable using this resin matrix, or a mixture thereof. For example, the monomer being curable using this resin matrix includes a (meth)acryl-based monomer, and this can be formed to a resin matrix material through UV curing. When using such a curable monomer, an initiator required for the curing can be further added as necessary.

The solvent is not particularly limited as long as the solvent can be removed by the subsequent drying, without adversely affecting the coating process. Nonlimiting examples of the solvent include toluene, xylene, acetone, chloroform, various alcohol-based solvents, methylethyl ketone (MEK), methylisobutyl ketone (MIBK), ethyl acetate (EA), butyl acetate, dimethylformamide (DMF), dimethylacetamide (DMAc), dimethyl sulfoxide (DMSO), N-methylpyrrolidone (NMP) and the like, and one type, or a mixture of two or more types can be used. When the first solution and the second solution are used, solvents included in each of the solutions can be the same as or different from each other. Even when different types of solvents are used in the first solution and the second solution, these solvents preferably have compatibility so as to be mixed to with each other.

The process of coating the substrate with the resin solution, in which the compound of Chemical Formula 1 is dissolved, can be carried out using a roll-to-roll process. For example, a process of unwinding a substrate from a substrate-wound roll, coating one surface of the substrate with the resin solution, in which the compound of Chemical Formula 1 is dissolved, drying the substrate, and then winding the substrate again on a roll can be used. When using a roll-to-roll process, the viscosity of the resin solution is preferably determined within a range capable of performing the above-mentioned process, and for example, the viscosity can be determined within a range of 200 cps to 2,000 cps.

As the coating method, various known methods can be used, and for example, a die coater can be used, or various bar coating methods such as a comma coater and a reverse comma coater can be used.

After the coating, a drying process is carried out. The drying process can be carried out under a condition required for removing the solvent. For example, a color conversion film including a fluorescent material including the compound of Chemical Formula 1 having a target thickness and concentration can be obtained on a substrate by carrying out drying under a condition sufficiently removing a solvent in an oven placed adjacent to a coater in a direction of a substrate progressing during a coating process.

When a monomer that is capable of being cured with the resin matrix resin is used as a resin included in the solution, curing, for example, UV curing, can be carried out prior to or at the same time with the drying.

When filming the compound of Chemical Formula 1 with a resin through extrusion, extrusion methods known in the art can be used, and for example, a color conversion film can be prepared by extruding the compound of Chemical Formula 1 with a resin such as polycarbonate (PC), poly(meth)acryl and styrene-acrylonitrile (SAN).

In another embodiment of the present specification, the color conversion film can be provided with a protective film or a barrier film on at least one surface thereof. As the protective film and the barrier film, those known in the art can be used.

Another embodiment of the present specification provides a backlight unit including the color conversion film described above. The backlight unit can have a backlight unit configuration known in the art, except that the backlight unit includes the color conversion film described above. FIG. 1 shows a schematic diagram of a backlight unit structure according to one example. The backlight unit according to FIG. 1 includes a side chain-type light source 101, a reflective plate surrounding the light source 102, a light guide plate 103 inducing light directly emitting from the light source, or light reflected from the reflective plate, a reflective layer 104 provided on one surface of the light guide plate, and a color conversion film 105 provided on the opposite surface of a surface facing the reflective layer of the light guide plate. In FIG. 1, the light dispersion pattern of the light guide plate is represented by the reference numeral 106. The light introduced into the light guide plate has a non-uniform light distribution due to repetition of optical processes such as reflection, total reflection, refraction and transmission, and a two-dimensional light dispersion pattern can be used to induce uniform brightness as well. However, the scope of the present invention is not limited to FIG. 1, and the light source can use a direct type as well as a side chain type, and the reflective plate or the reflective layer may not be included or can be replaced with other configuration, and as necessary, an additional film such as a light diffusion film, a light collecting film, a brightness enhancing film or the like can be further provided.

Another embodiment of the present specification provides a display device including the backlight unit. The display device is not particularly limited as long as it includes the backlight unit, and can be included in TVs, computer monitors, laptops, mobile phones and the like.

Hereinafter, the present specification will be described in detail with reference to the following Examples. However, the following examples can be modified to different forms and should not be construed as limiting the scope of the present specification. The examples are suggested only to offer thorough and complete understanding of the present specification to those having ordinary knowledge in the art.

Comparative Example 1

[Compound A]

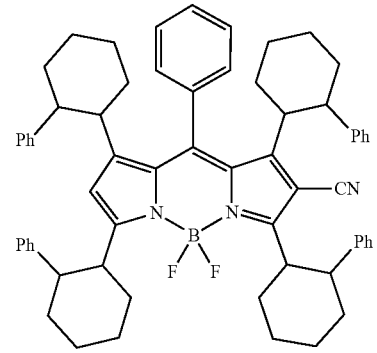

[Preparation Method A]

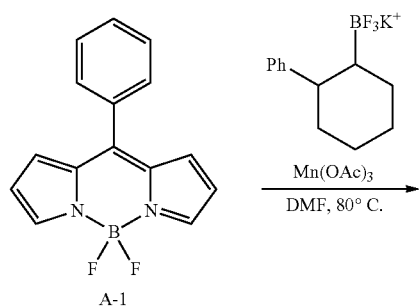

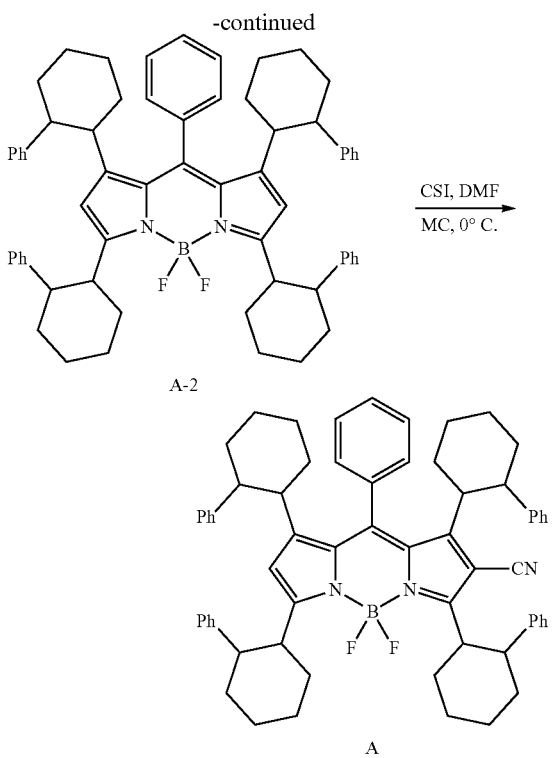

A-2

A

<Preparation of A-1>

Pyrrole (1.7 g, 23.8 mmol) was dissolved in dichloromethane, and benzaldehyde (1.2 g, 11.9 mmol) was added to the resulting solution and stirred for about 15 minutes. After adding 1 to 2 drops of trifluoroacetic acid, the mixture was stirred at room temperature for 12 hours. Then, 2,3-dichloro-5,6-dicyano-p-benzoquinone (2.7 g, 11.9 mmol) was added thereto and further stirred for 15 minutes. DIEA (N,N-diisopropylethylamine) (21.5 g, 166 mmol) was added to the stirred mixture and a boron trifluoride-ethyl ether complex (25 g, 178 mmol) was then slowly added thereto and further stirred for 5 hours. After completion of the stirring, the reaction was terminated with water, the organic layer was extracted with dichloromethane, the extracted material was concentrated, and A-1 was purified by column chromatography. $[M-F]^+=248$ <Preparation of A-2>

A-1 (0.76 g, 2.4 mmol) was dissolved in dimethylformamide, potassium 2-phenylcyclohexyltrifluoroborate (2 g, 10.8 mmol) and $Mn(OAc)_3$ (7 g, 26.4 mmol) were added thereto, stirring was conducted at 80° C. for 1 hour, and the reaction was then terminated. The organic layer was extracted with water and ethyl acetate, the extracted material was concentrated and A-2 was purified by column chromatography. $[M-F]^+=881$ <Preparation of Compound A>

Compound A-2 (1 g, 1.6 mmol) was dissolved in methylene chloride, and then chlorosulfonyl isocyante (0.7 g, 4.8 mmol) was slowly added thereto at 0° C., followed by stirring for 1 hour. After completion of the stirring, dimethylformamide (1.3 mL, 16 mmol) was added and stirred for 1 hour. After completion of the reaction, the reaction solution was neutralized with a 1N NaOH solution, the organic layer was extracted with saturated $NaHCO_3$ and methylene chloride, the extracted material was concentrated, and [Compound A] was purified by column chromatography. $[M-F]=906$ Method for Producing Green Film Using [Compound A]

The prepared [Compound A] was used to produce a green light-emitting color conversion film. Specifically, with respect to 100% by weight of a SAN polymer, [Compound A], which is a green light emitting material, was added at a ratio of 0.4% by weight, and a diffuser particle was added at a ratio of 3% by weight, and a PET film was coated with a solution of 30 wt % solid content in a normal butyl acetate solvent, to produce a green light emitting color conversion film. A 160 mm×90 mm backlight unit was produced using a blue LED light source with the produced green conversion film. The optical properties of the produced backlight unit were evaluated.

Method for Producing White Film Using [Compound A]

A green film using the prepared [Compound A] and a film including a red phosphor (maximum absorption wavelength: 575 nm, maximum emission wavelength: 610 nm) were separately produced and laminated to produce a white film. The luminescence spectrum of the produced film was measured with a spectroradiometer (SR series manufactured by TOPCON Corp.). Specifically, the produced color conversion film was laminated on one surface of a light guide plate of a backlight unit including an LED blue backlight (maximum emission wavelength: 450 nm) and a light guide plate, and a prism sheet and a DBEF film were laminated on the color conversion film. Then, the brightness spectrum of the film was measured and color reproduction rate (color gamut) was obtained. The results are shown in Table 6.

Comparative Example 2

[Compound B]

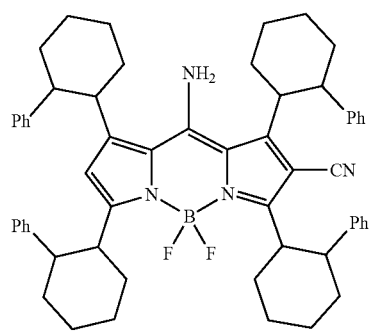

[Preparation Method B]

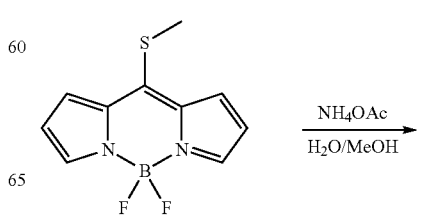

-continued

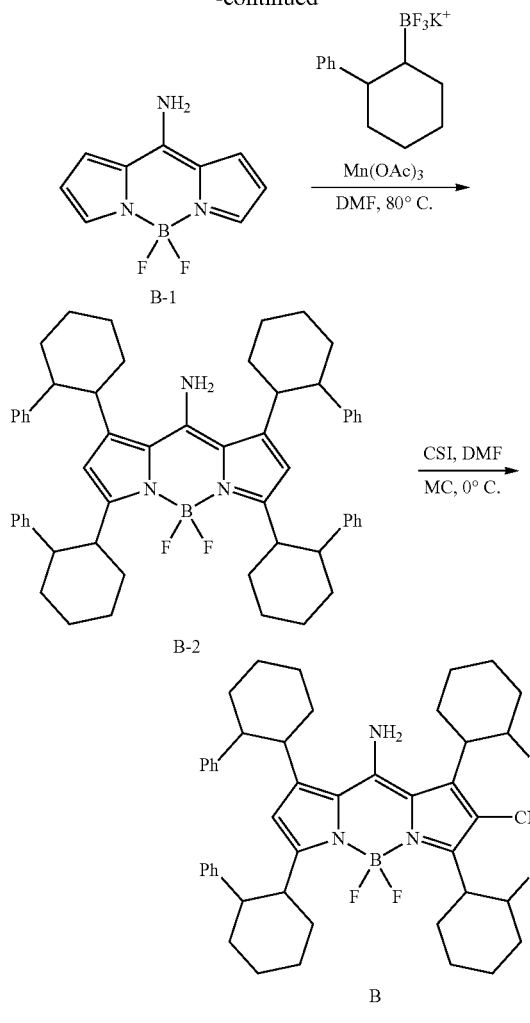

<Preparation of B-1>

1 equivalent of 5,5-difluoro-10-(methylthio)-5H-4λ⁴, 5λ⁴-dipyrrolo [1,2-c:2', 1'-f] [1,3, 2] diazaborinine was dissolved in a mix solution of water/methanol (1:1, v/v), 1 equivalent of ammonium acetate (NH₄OAC) was added to the solution, and the mixture was stirred at 60° C. for 2 hours. After completion of the stirring, the solvent was evaporated, the residue was concentrated, and B-1 was purified by column chromatography. $[M-F]^+=187$ <Preparation of B-2>

B-2 was prepared in the same manner as in Preparation of A-2, except that B-1 was used, instead of A-1. $[M-F]^+=830$ <Preparation of Compound B>

Compound B was prepared in the same manner as in Preparation of Compound A, except that B-2 was used, instead of A-2. $[M-F]^+=844$ Method for Producing Green Film Using [Compound B]

The prepared [Compound B] was used to produce a green light-emitting color conversion film. Specifically, with respect to 100% by weight of a SAN polymer, [Compound B], which is a green light emitting material, was added at a ratio of 0.4% by weight, and a diffuser particle was added at a ratio of 3% by weight, and a PET film was coated with a solution of 30 wt % solid content in a normal butyl acetate solvent, to produce a green light emitting color conversion film. A 160 mm×90 mm backlight unit was produced using a blue LED light source with the produced green conversion film. The optical properties of the produced backlight unit were evaluated.

Method for Producing White Film Using [Compound B]

A green film using the prepared [Compound B] and a film including a red phosphor (maximum absorption wavelength: 575 nm, maximum emission wavelength: 610 nm) were separately produced and laminated to produce a white film. The luminescence spectrum of the produced film was measured with a spectroradiometer (SR series manufactured by TOPCON Corp.). Specifically, the produced color conversion film was laminated on one surface of a light guide plate of a backlight unit including an LED blue backlight (maximum emission wavelength: 450 nm) and a light guide plate, and a prism sheet and a DBEF film were laminated on the color conversion film. Then, the brightness spectrum of the film was measured and color reproduction rate (color gamut) was obtained. The results are shown in Table 6.

Example 1

C

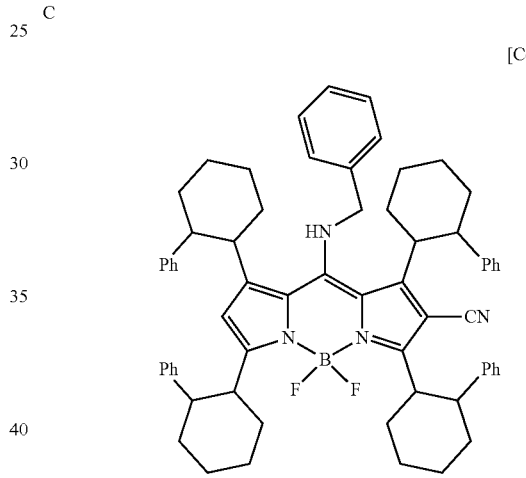

[Compound C]

[Preparation Method C]

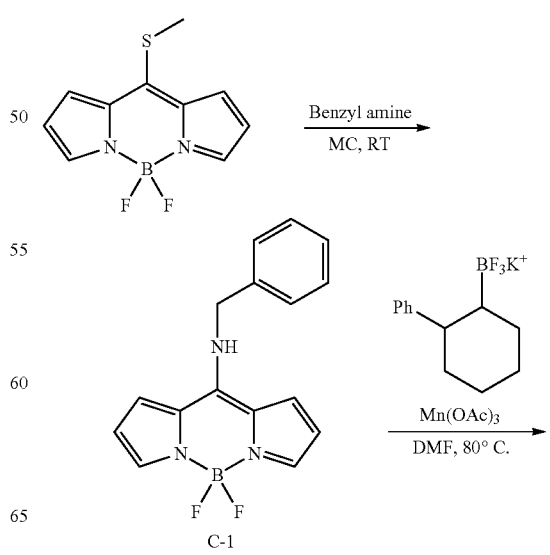

-continued

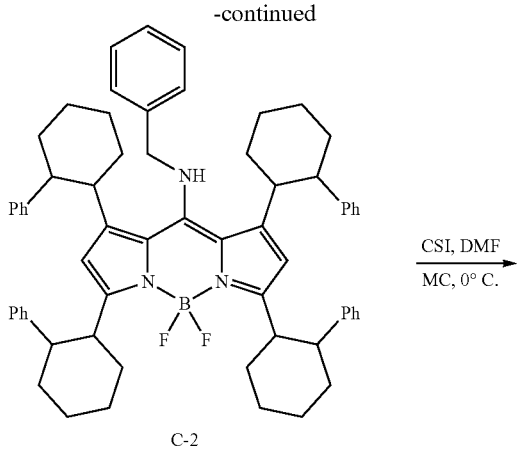

C-2

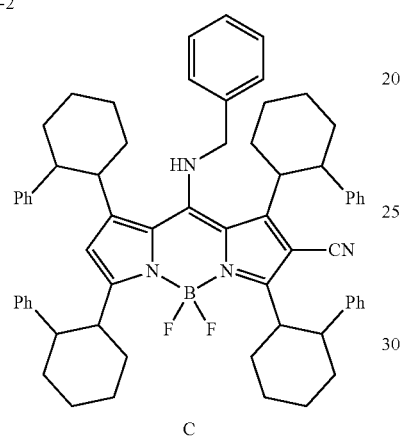

C

<Preparation of C-1>

5,5-difluoro-10-(methylthio)-5H-4λ⁴, 5λ⁴-dipyrrolo[1,2-c:2',1'-f][1,3,2]diazaborinine was dissolved in DCM, and benzyl amine was added to the resulting solution and the mixture was stirred at room temperature for 30 minutes. After completion of the stirring, the organic layer was extracted with dichloromethane, the extracted material was concentrated, and C-1 was purified by column chromatography. $[M-F]^+=277$ <Preparation of C-2>

C-2 was prepared in the same manner as in Preparation of A-2, except that C-1 was used, instead of A-1. $[M-F]^+=910$ <Preparation of Compound C>

Compound C was prepared in the same manner as in Preparation of Compound A, except that C-2 was used, instead of A-2. $[M-F]^+=935$ Method for Producing Green Film Using [Compound C]

The prepared [Compound C] was used to produce a green light-emitting color conversion film. Specifically, with respect to 100% by weight of a SAN polymer, [Compound C], which is a green light emitting material, was added at a ratio of 0.4% by weight, and a diffuser particle was added at a ratio of 3% by weight, and a PET film was coated with a solution of 30 wt % solid content in a normal butyl acetate solvent, to produce a green light emitting color conversion film. A 160 mm×90 mm backlight unit was produced using a blue LED light source with the produced green conversion film. The optical properties of the produced backlight unit were evaluated.

In the preparation of Compound C, a compound having a variety of R7 can be prepared using substituents corresponding to R7 of the present specification, instead of benzylamine used to prepare C-1, and in the preparation of Compound C-2, a compound having a variety of R1, R3, R4 and R6 can be prepared using substituents corresponding to R1, R3, R4 and R6 of the present specification, instead of potassium 2-phenylcyclohexyltrifluoroborate.

Method for Producing White Film Using [Compound C]

A green film using the prepared [Compound C] and a film including a red phosphor (maximum absorption wavelength: 575 nm, maximum emission wavelength: 610 nm) were separately produced and laminated to produce a white film. The luminescence spectrum of the produced film was measured with a spectroradiometer (SR series manufactured by TOPCON Corp.). Specifically, the produced color conversion film was laminated on one surface of a light guide plate of a backlight unit including an LED blue backlight (maximum emission wavelength: 450 nm) and a light guide plate, and a prism sheet and a DBEF film were laminated on the color conversion film. Then, the brightness spectrum of the film was measured and color reproduction rate (color gamut) was obtained. The results are shown in Table 6.

Example 2

[Compound D]

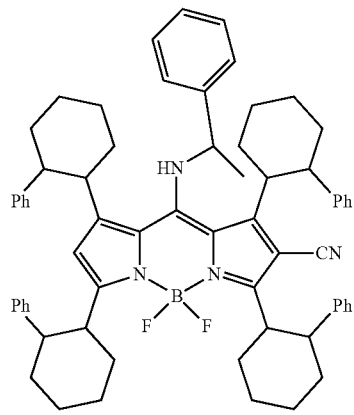

<Preparation of D-1>

D-1 was prepared in the same manner as in Preparation of C-1, except that alpha-methyl benzylamine was used, instead of benzyl amine. $[M-F]^+=291$ <Preparation of D-2>

D-2 was prepared in the same manner as in Preparation of C-2, except that D-1 was used, instead of C-1.

<Preparation of Compound D>

Compound D was prepared in the same manner as in Preparation of Compound C, except that D-2 was used, instead of C-2. $[M-F]^+=949$ Method for Producing Green Film Using [Compound D]

The prepared [Compound D] was used to produce a green light-emitting color conversion film. Specifically, with respect to 100% by weight of a SAN polymer, [Compound D], which is a green light emitting material, was added at a ratio of 0.4% by weight, and a diffuser particle was added at a ratio of 3% by weight, and a PET film was coated with a solution of 30 wt % solid content in a normal butyl acetate solvent, to produce a green light emitting color conversion film. A 160 mm×90 mm backlight unit was produced using a blue LED light source with the produced green conversion film. The optical properties of the produced backlight unit were evaluated.

Method for Producing White Film Using [Compound D]

A green film using the prepared [Compound D] and a film including a red phosphor (maximum absorption wavelength: 575 nm, maximum emission wavelength: 610 nm) were separately produced and laminated to produce a white film. The luminescence spectrum of the produced film was measured with a spectroradiometer (SR series manufactured by TOPCON Corp.). Specifically, the produced color conversion film was laminated on one surface of a light guide plate of a backlight unit including an LED blue backlight (maximum emission wavelength: 450 nm) and a light guide plate, and a prism sheet and a DBEF film were laminated on the color conversion film. Then, the brightness spectrum of the film was measured and color reproduction rate (color gamut) was obtained. The results are shown in Table 6.

The maximum emission wavelengths of the backlight units produced in Comparative Examples 1 and 2, and Examples 1 and 2 were measured and are shown in Table 5 below.

TABLE 5

| Film | Comparative Example 1 | Comparative Example 2 | Example 1 | Example 2 |
|---|---|---|---|---|
| Maximum emission wavelength [nm] | 542 | 503 | 513 | 516 |

TABLE 6

| | Brightness (nit) | Color gamut (%) | |
| | | Area ratio based on sRGB | Overlap ratio based on sRGB |
|---|---|---|---|
| Comparative Example 1 | 169 | 108 | 88 |
| Comparative Example 2 | 215 | 91 | 74 |
| Example1 | 254 | 116 | 94 |
| Example 2 | 236 | 117 | 94 |

As can be seen from Table 5, the maximum emission wavelengths of the compounds of Examples 1 and 2 were measured at an about 30 nm shorter wavelength region than the compound of Comparative Example 1. As can be seen from Table 6 above, the compounds of Examples 1 and 2 were found to have improved color reproduction rate (color gamut), when producing a white film, as compared to the compound of Comparative Example 1.

In addition, in Comparative Example 2 using the compound in which the substituent at the position of R7 is —$NH_2$, the maximum emission wavelength was measured at an about 10 to 13 nm shorter wavelength region than Examples 1 and 2. For this reason, Comparative Example 2 did not satisfy desired sRGB color spaces and thus had lower color reproduction rates (color gamut) than those of Examples 1 and 2.

The invention claimed is:

1. A compound of the following Chemical Formula 1:

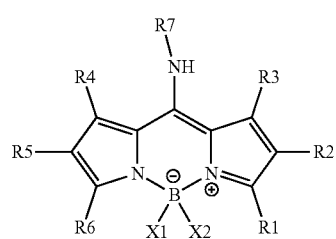

[Chemical Formula 1]

wherein in Chemical Formula 1:
R2 and R5 are identical to or different from one another, and are each independently hydrogen, deuterium or a cyano group;
R1, R3, R4, and R6 are identical to or different from one another, and are each independently a cycloalkyl group substituted with a phenyl group;
R7 is

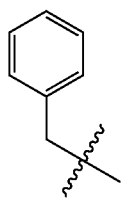 [SMILES: *Cc1ccccc1]

or

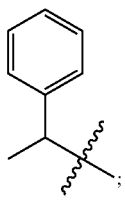

;

and
X1 and X2 are F,
wherein, when one of R2 or R5 is hydrogen, the remainder is a cyano group.

2. The compound of claim 1, wherein the compound of Chemical Formula 1 has a 1 nm to 100 nm lower maximum emission peak than a compound wherein R1 to R7, X1 and X2 are the same as in the compound of Chemical Formula 1 except that R7 is directly bonded to the core structure without the NH linker.

3. The compound of claim 1, wherein the compound of Chemical Formula 1 has a 1 nm to 100 nm lower maximum absorption peak than a compound wherein R1 to R7, X1 and X2 are the same as in the compound of Chemical Formula 1 except that R7 is directly bonded to the core structure without the NH linker.

4. A color conversion film comprising:
a resin matrix; and
the compound according to claim 1 dispersed in the resin matrix.

5. A backlight unit comprising the color conversion film according to claim 4.

6. A display device comprising the backlight unit according to claim 5.

\* \* \* \* \*